United States Patent [19]
Lamy et al.

[11] 3,801,939
[45] Apr. 2, 1974

[54] WAVEGUIDE ASSEMBLY

[75] Inventors: Michel Lamy; Michel Vallet, both of Paris, France

[73] Assignee: Thomson-CSF, Paris, France

[22] Filed: Apr. 13, 1973

[21] Appl. No.: 351,038

[30] Foreign Application Priority Data
Apr. 19, 1972    France .............................. 72.13829

[52] U.S. Cl. ................ 333/95 R, 333/98 R, 29/600
[51] Int. Cl. ........................ H01p 3/12, H01p 11/00
[58] Field of Search ........... 333/95 R, 98 R; 29/600, 29/601

[56] References Cited
UNITED STATES PATENTS
| | | | |
|---|---|---|---|
| 2,840,897 | 7/1958 | Ingalls................................... | 29/600 |
| 2,996,790 | 8/1961 | Trafford............................ | 333/95 R |
| 3,157,847 | 11/1964 | Williams ........................... | 333/95 R |

FOREIGN PATENTS OR APPLICATIONS
675,649   12/1963   Canada................................. 29/600

*Primary Examiner*—James W. Lawrence
*Assistant Examiner*—Wm. H. Punter
*Attorney, Agent, or Firm*—Cushman, Darby & Cushman

[57] ABSTRACT

An assembly of n parallel rectangular waveguides, joined at their sides. The assembly is formed by two open-profile elements having respective parallel partitions the interlocking of which defines the $n$ waveguides. The fixing together of the two elements is affected by snap-connection of the partitions, those partitions having to this end, beside a smooth side forming the internal wall of a waveguide, a side with a double-notch profile.

4 Claims, 1 Drawing Figure

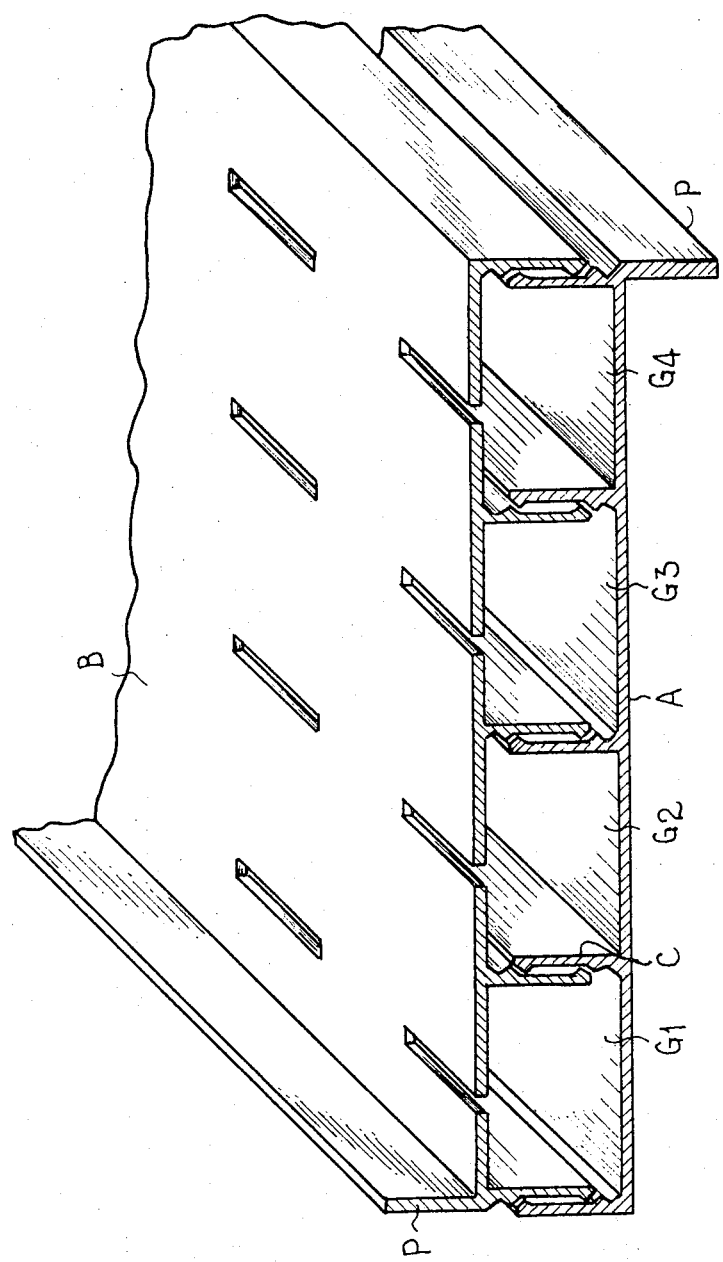

WAVEGUIDE ASSEMBLY

The present invention relates to assemblies of rectangular waveguides particularly of waveguides with radiating apertures in one of their faces, which can be utilised in the building of microwave antennas.

The known assemblies of this kind comprise $n$ waveguides with parallel axes, joined side by side, these waveguides being provided with apertures in one of their sides, corresponding to one and the same face of the assembly.

These assemblies are generally produced using $n$ separate standard waveguides which are fixed to one another by a brazing process or by mechanical means.

As the apertures are machined in the tubes from outside, burs are produced inside the waveguides and since the apertures are of small dimensions it is difficult to remove these burs.

The qualities of the assembly depend upon accurate machining of the apertures, accurate positioning of the apertures in relation to one another and relatively to the internal walls of the waveguides, upon correct geometric structure and upon accurate positioning of the waveguides in relation to each other; these conditions are difficult to fulfil, in particular in the case of elements having substantial lengths, in which case twisting of the waveguides may occur when they are secured to one another.

The object of the present invention is to overcome these drawbacks by using an open structure which groups the $n$ waveguides together while giving easy access to the internal walls of the waveguides.

According to the invention, there is provided an assembly of $n$ adjacent rectangular waveguides having parallel axes and respective walls, $n$ being an integer greater then one, said assembly comprising two open-profile elements fitted into one another, each of said elements comprising a plate and partitions perpendicular to said plate, each of said waveguides being limited by the plates of said two elements and by two consecutive partitions of one of said two elements.

The invention will be better understood and other of its features rendered apparent, from the following description and appended drawing, the latter being a perspective view of an embodiment of an assembly in accordance with the invention, with four waveguides joined by their narrow walls, the view showing the system in the course of being assembled.

In the figure, two elements A and B having identical profiles are shown; each element takes the form of a metal plate one of whose faces carries five identical partitions such as those marked C, mutually parallel and normal to the supporting surface; each supporting surface forms one of the broad walls of each waveguides $G_1$, $G_2$, $G_3$, $G_4$. Depending upon whether it is an A or B element which is concerned, it either does or does not comprise apertures belonging to the relevant waveguides.

Each partition has a smooth side which forms the internal narrow wall of a waveguide and a "double-notch" profiled side, which creates an interfitting system. Each profiled side is provided with two notches respectively located at the bottom and at the top of the partition.

In one and the same element two smooth sides face each other, and two profiled sides face each other.

The alternating arrangement of the sides of the partitions provides a rigid interlocking structure, so designed that the internal narrow walls of any one of the waveguides belong to two partitions of one and the same element.

The requisite mechanical elasticity for the assembly of the elements, without any resulting geometric distortion of the waveguides, is achieved by giving the partition suitable dimensions.

In order to improve the mechanical stiffness of the assembly and to secure extremely good electrical contact between the different walls of one and the same waveguide, the profiled sides are coated, prior to interlocking, with a polymerisable resin filled with silver particles, which resin covers the mutually contacting portions by capillary action.

In the drawing, each profiled element comprises a wall P perpendicular to the plate, at the side opposite to the partitions, which wall can do duty as an electrical partition between two half-antennas in the case of a microwave antenna made up of two like assemblies.

As an inspection of the figure shows, considering the waveguides $G_1$, $G_2$ and $G_3$, the two elements which correspond to an assembly having an odd number of waveguides, differ from each other simply in terms of the orientation of the sides of the partitions.

If the production of standard elements corresponding to each value of $n$ is to be avoided, then for ($2n-1$) waveguides, elements such as those provided for $2n$ waveguides can be used and these components either cut off or the location provided for the last waveguide left unused.

The production of slotted waveguide assemblies by the interlocking of open profile elements, makes it possible to achieve microwave antennas of excellent performance at a cost price much lower than that required for antennas produced by conventional methods.

What is claimed is:

1. An assembly of n adjacent rectangular waveguides having parallel axes and respective walls, n being an integer greater than 1, said assembly comprising two open-profile elements fitted into one another, each of said elements comprising a plate and partitions perpendicular to said plate, each of said waveguides being limited by the plates of said two elements and by two consecutive partitions of one of said two elements.

2. An assembly of waveguides as claimed in claim 1, wherein each of said partitions has a smooth side forming an internal wall of one of said waveguides and a profiled side with a double-notch, the profiled sides of the partitions of each one of said elements interlocking with the profiled sides of the partitions of the other.

3. An assembly of n waveguides as claimed in claim 2, where $n$ is even and wherein said two elements have identical profiles.

4. An assembly of waveguides as claimed in claim 3, wherein the plate of one of said two elements is provided with apertures.

* * * * *